United States Patent
Sukegawa

(10) Patent No.: US 8,443,258 B2
(45) Date of Patent: May 14, 2013

(54) MEMORY DEVICE INCLUDING MEMORY CONTROLLER

(75) Inventor: Hiroshi Sukegawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/531,055

(22) Filed: Jun. 22, 2012

(65) Prior Publication Data

US 2012/0266045 A1    Oct. 18, 2012

Related U.S. Application Data

(63) Continuation of application No. 13/207,733, filed on Aug. 11, 2011, now Pat. No. 8,230,301, which is a continuation of application No. 11/862,669, filed on Sep. 27, 2007, now Pat. No. 8,028,206.

(30) Foreign Application Priority Data

Sep. 29, 2006  (JP) ................................. 2006-268549

(51) Int. Cl.
*G11C 29/00*    (2006.01)
(52) U.S. Cl.
USPC ........................ 714/763; 365/201; 365/185.33
(58) Field of Classification Search .................. 714/763; 365/201, 185.33
See application file for complete search history.

(56) References Cited

U.S. PATENT DOCUMENTS

| | | | |
|---|---|---|---|
| 4,506,365 A | 3/1985 | Collins | |
| 5,873,112 A | 2/1999 | Norman | |
| 6,003,144 A | 12/1999 | Olarig et al. | |
| 6,088,261 A | 7/2000 | Nakajima | |
| 6,269,220 B1 | 7/2001 | Jeong et al. | |
| 6,330,644 B1 | 12/2001 | Yamashita et al. | |
| 6,535,422 B2 | 3/2003 | Goto et al. | |
| 6,847,553 B2 * | 1/2005 | Chen et al. | 365/185.09 |
| 6,853,602 B2 | 2/2005 | Huang | |
| 6,937,515 B2 * | 8/2005 | Sudo et al. | 365/185.12 |
| 6,941,412 B2 | 9/2005 | Gongwer et al. | |
| 6,996,017 B2 * | 2/2006 | Scheuerlein et al. | 365/201 |
| 7,237,074 B2 | 6/2007 | Guterman et al. | |
| 7,257,032 B2 | 8/2007 | Fujiu et al. | |
| 7,307,884 B2 * | 12/2007 | Guterman | 365/185.18 |
| 7,352,628 B2 | 4/2008 | Kamei | |
| 7,426,136 B2 | 9/2008 | Sakurai et al. | |
| 7,426,675 B2 | 9/2008 | Harrand | |
| 7,450,421 B2 | 11/2008 | Mokhlesi et al. | |
| 7,460,399 B1 | 12/2008 | Harari et al. | |
| 7,480,176 B2 | 1/2009 | Kamei | |
| 7,492,660 B2 | 2/2009 | Harari et al. | |
| 7,565,593 B2 | 7/2009 | Dixon et al. | |

(Continued)

FOREIGN PATENT DOCUMENTS

JP    11-317095    11/1999

*Primary Examiner* — Esaw Abraham
(74) *Attorney, Agent, or Firm* — Oblon, Spivak, McClelland, Maier & Neustadt, L.L.P.

(57) ABSTRACT

A memory device includes a semiconductor memory including a plurality of memory cells, and a controller including a buffer which temporarily stores data, a data pattern check circuit which checks a predetermined data pattern of data that are stored in the buffer and are to be stored in a plurality of neighboring ones of the memory cells, and sends an address in accordance with a result of the check, and a data correction circuit which corrects a value of data at the address that is sent, and sends the corrected value to the semiconductor memory.

10 Claims, 14 Drawing Sheets

U.S. PATENT DOCUMENTS

| | | |
|---|---|---|
| 7,567,455 B2 | 7/2009 | Khaef |
| 7,570,518 B2 * | 8/2009 | Guterman ................ 365/185.18 |
| 7,606,966 B2 | 10/2009 | Li et al. |
| 7,606,993 B2 * | 10/2009 | Oyaizu et al. ................. 711/203 |
| 7,620,769 B2 * | 11/2009 | Lee et al. ...................... 711/103 |
| 7,660,158 B2 | 2/2010 | Aritome |
| 7,676,728 B2 | 3/2010 | Resnick et al. |
| 7,689,879 B2 | 3/2010 | Jeddeloh |
| 7,734,861 B2 | 6/2010 | Li et al. |
| 7,760,555 B2 | 7/2010 | Guterman et al. |
| 7,774,684 B2 | 8/2010 | Bains |
| 7,958,412 B2 | 6/2011 | Jeddeloh |
| 2002/0035710 A1 | 3/2002 | Miura et al. |

\* cited by examiner

Memory cell array after write according to present embodiment

Read operation

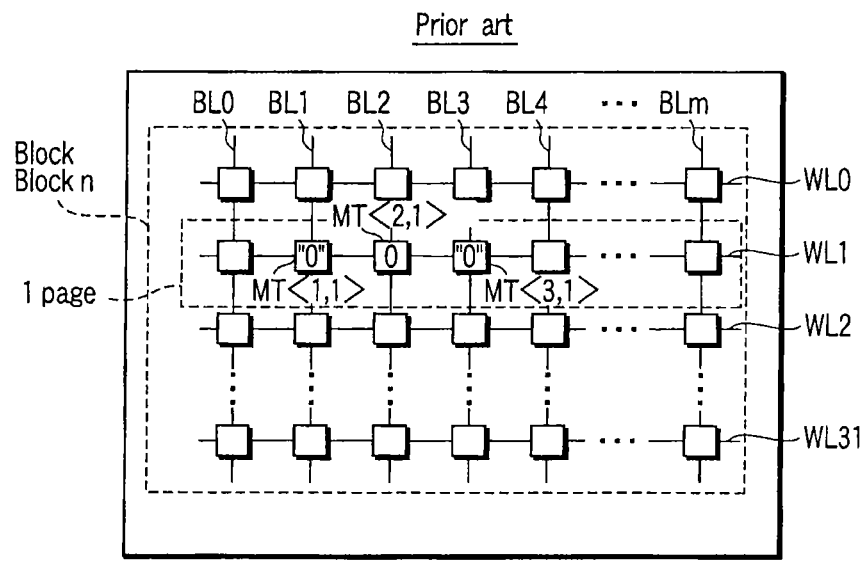
F I G. 12
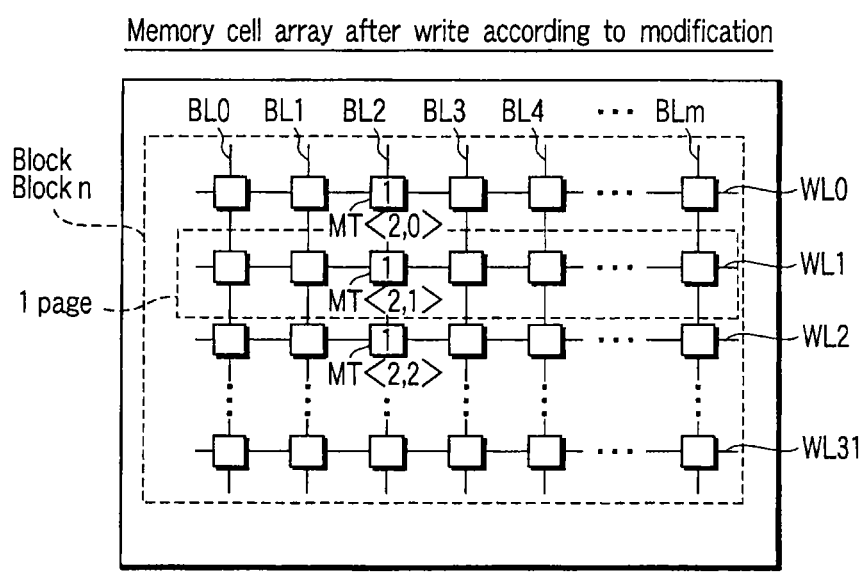
F I G. 13

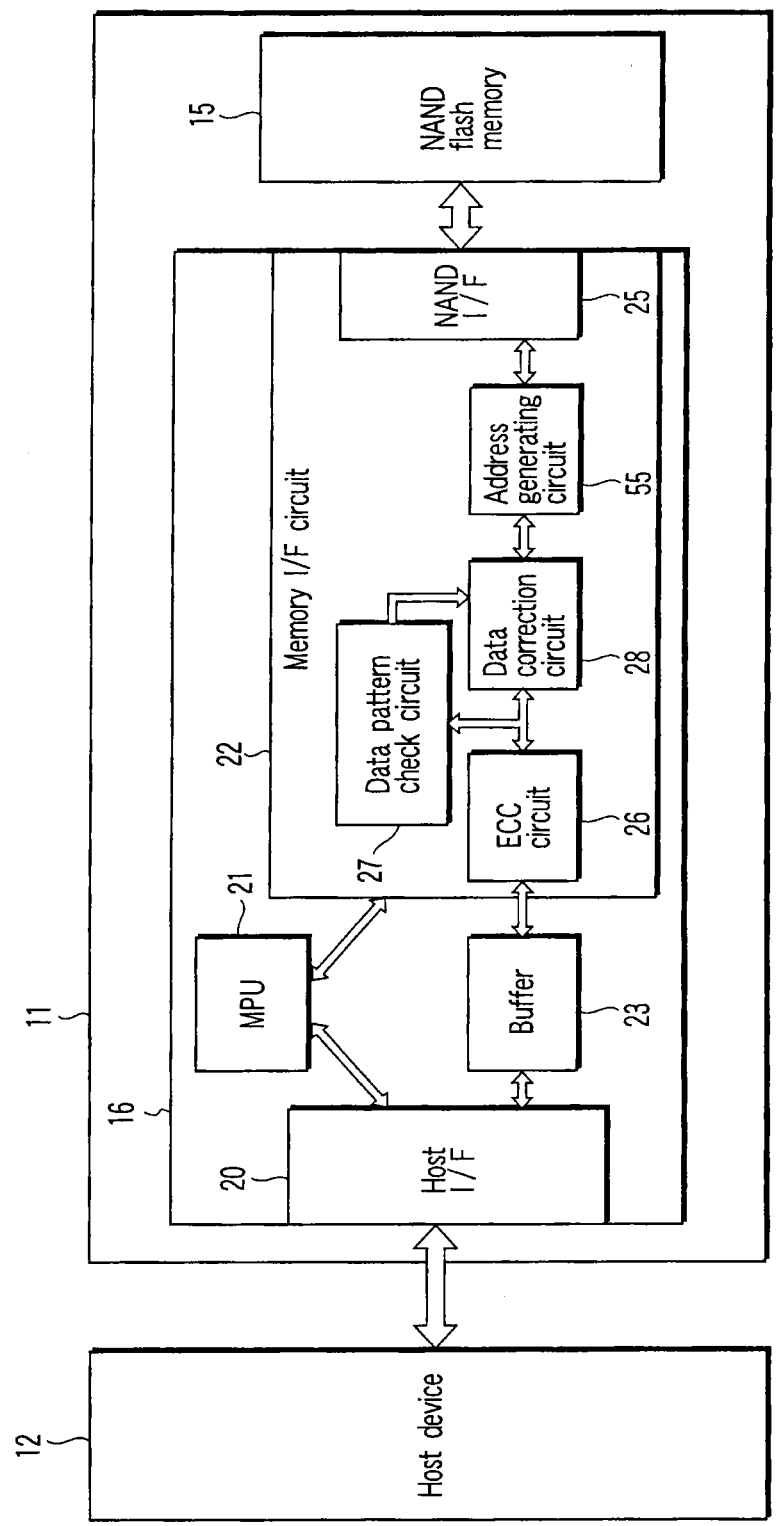
F I G. 16

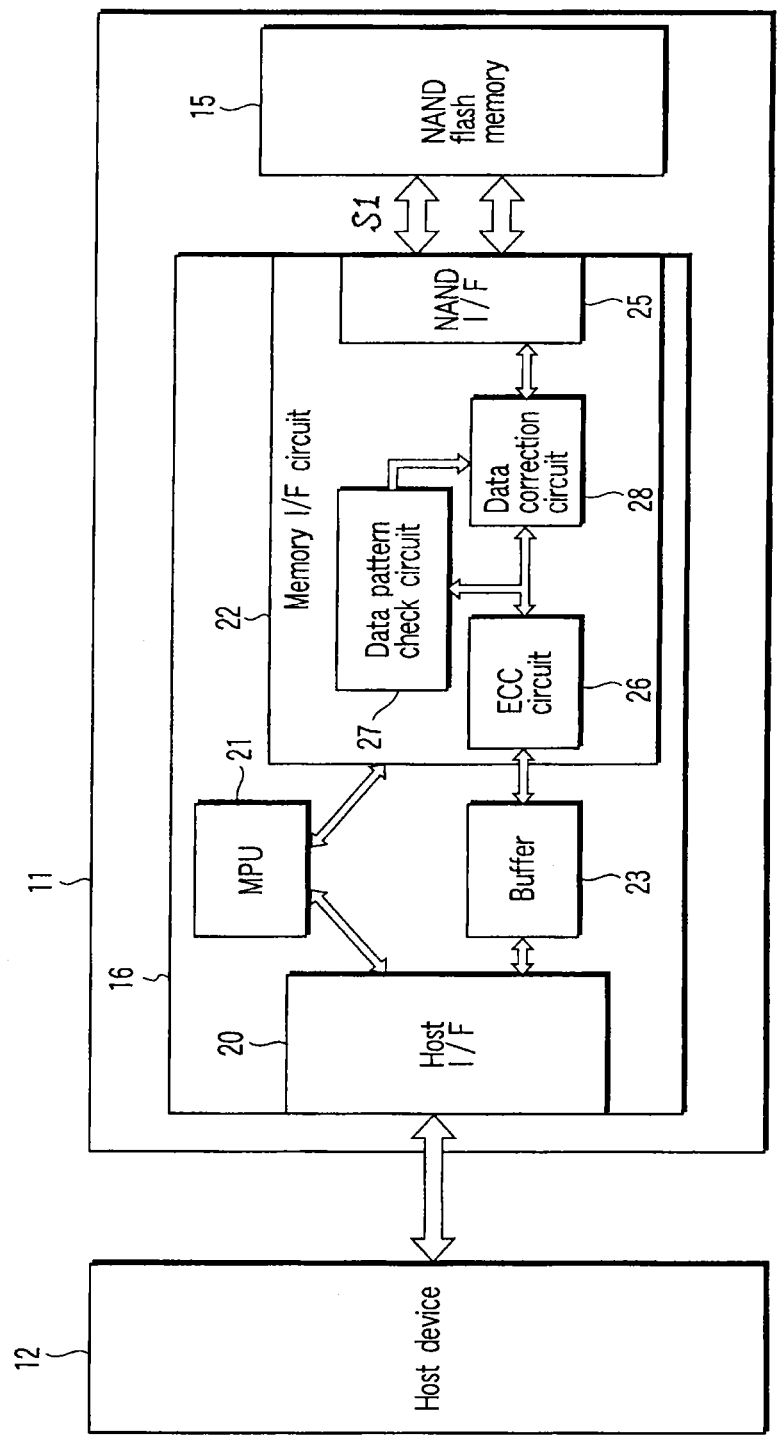
F I G. 20

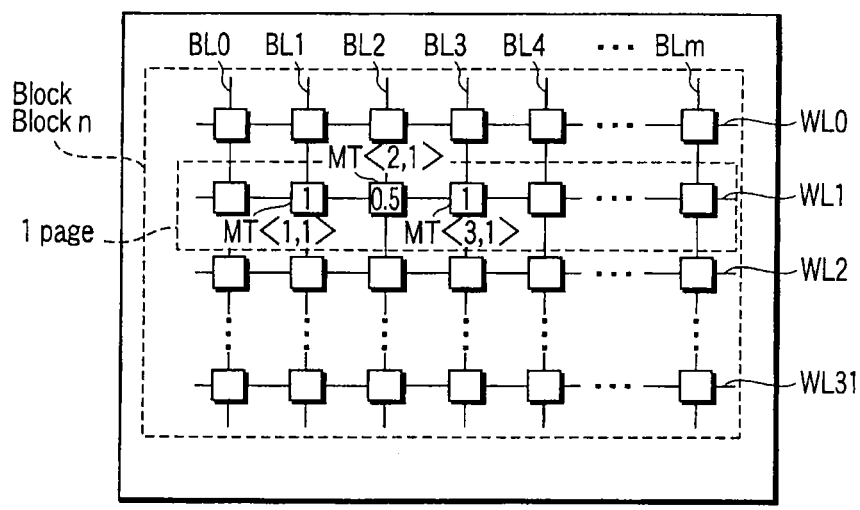
F I G. 22

MEMORY DEVICE INCLUDING MEMORY CONTROLLER

CROSS-REFERENCE TO RELATED APPLICATIONS

This application is a continuation of U.S. application Ser. No. 13/207,733 filed Aug. 11, 2011, which is a continuation of U.S. application Ser. No. 11/862,669 filed Sep. 27, 2007, (now U.S. Pat. No. 8,028,206) and is based upon and claims the benefit of priority from prior Japanese Patent Application No. 2006-268549, filed Sep. 29, 2006, the entire contents of each of which are incorporated herein by reference.

BACKGROUND OF THE INVENTION

1. Field of the Invention

The present invention relates to a memory device, and is applied, for example, to a memory card including a flash memory.

2. Description of the Related Art

In recent years, there has been an increasing demand for a nonvolatile memory in accordance with an increase in memory capacity thereof. However, in order to increase the memory capacity of the nonvolatile memory, it is necessary to perform high-density recording. As a result, the distance between neighboring memory cells becomes smaller. Consequently, garbling of data occurs, and data in the memory cell is erroneously read out by the influence of neighboring data values. Recovery of data is impossible even if an error correcting code (ECC) with a high error correcting capability is used.

For example, in the case of a single-level NAND flash memory which is capable of recording 1-bit data in one memory cell, carriers are injected in a floating gate (FG) when data "0" is written in a memory cell. However, with the progress in microfabrication for increasing the recording density, the distance between memory cells decreases and the value of capacitive coupling occurring between the floating gates (FG) of neighboring memory cells increases. In this case, if carriers are injected in the floating gate (FG) when data "0" is written in the memory cell, the potential of the floating gate of a neighboring memory cell varies due to capacitive coupling. There is the tendency that owing to this variation in potential, garbling of data occurs and data "1" written in the neighboring memory cell is erroneously read out as data "0", resulting in irrecoverability of data and degradation in reliability. Moreover, the garbling of data may occur in either a memory cell which neighbors in a bit line direction or a memory cell which neighbors in a word line direction.

Jpn. Pat. Appln. KOKAI Publication No. 11-317095, for instance, discloses a semiconductor memory device which can efficiently and exactly execute error detection and error correction, even if stored multi-value information is lost due to garbling of data resulting from, for example, degradation of a memory cell, which necessarily occurs with repeated use.

BRIEF SUMMARY OF THE INVENTION

According to an aspect of the present invention, there is provided a memory device comprising: a semiconductor memory including a plurality of memory cells; and a memory controller including a buffer which temporarily stores data, a data pattern check circuit which checks a predetermined data pattern of data that are stored in the buffer and are to be stored in a plurality of neighboring ones of the memory cells, and a data correction circuit which corrects a value of data at an address corresponding to the predetermined data pattern, in accordance with a result of the check, and sends the corrected value to the semiconductor memory including a plurality of memory cells.

According to another aspect of the present invention, there is provided a memory device comprising: a semiconductor memory including a plurality of memory cells; and a controller including a buffer which temporarily stores data, a data pattern check circuit which checks a predetermined data pattern of data that are stored in the buffer and are to be stored in a plurality of neighboring ones of the memory cells, and sends an address in accordance with a result of the check, and a data correction circuit which shifts a level of a value of data at the address that is sent, and sends the write level-shifted value to the semiconductor memory including a plurality of memory cells.

BRIEF DESCRIPTION OF THE SEVERAL VIEWS OF THE DRAWING

FIG. 12 is a view for describing a memory device in which garbling of data occurs in a bit line direction in the prior art;

FIG. 13 shows a memory cell array after a write operation according to a modification of the invention;

FIG. 16 is a plan view for describing a memory device according to a second embodiment of the invention;

FIG. 20 is a plan view for describing a memory device according to a third embodiment of the invention;

FIG. 22 shows a memory cell array after the write operation according to the third embodiment.

DETAILED DESCRIPTION OF THE INVENTION

Figure 1:
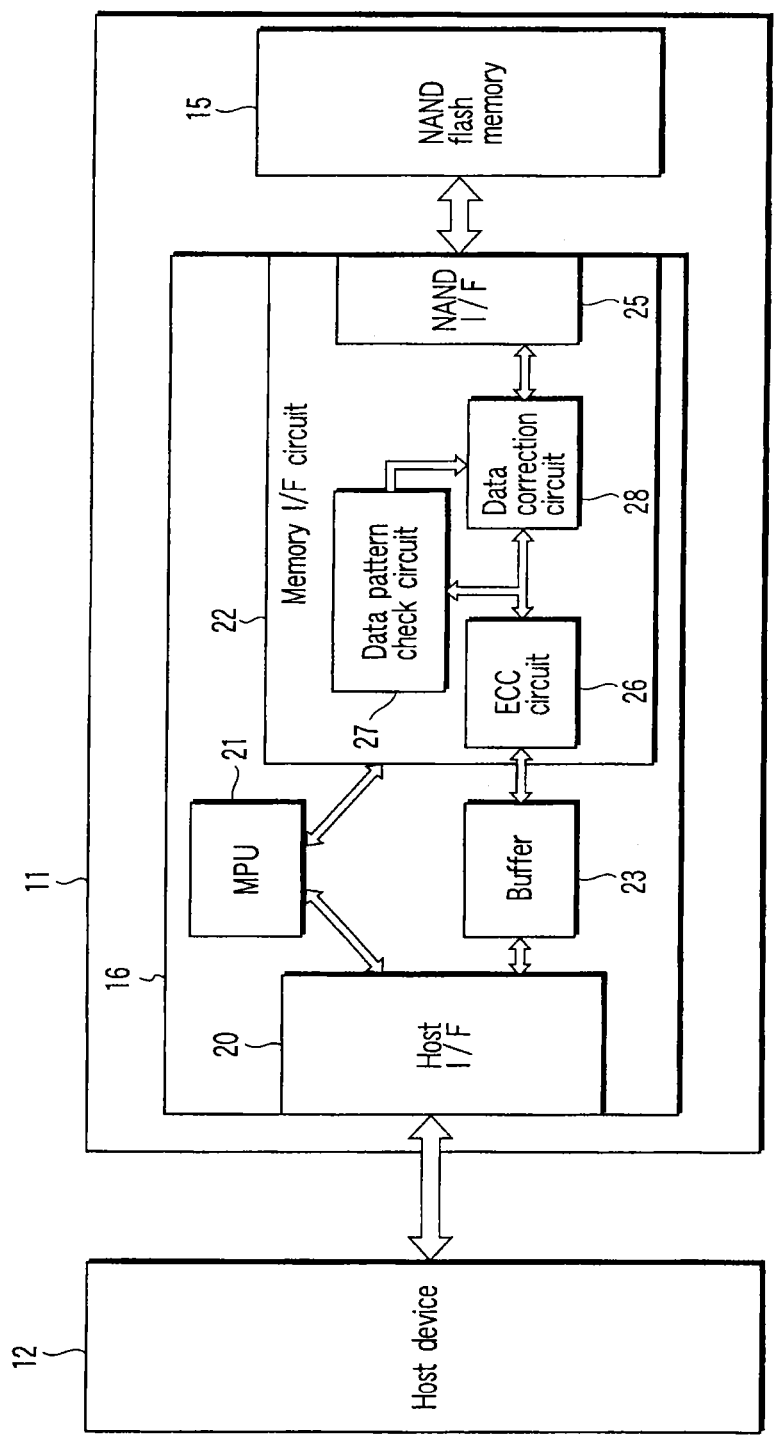
FIG. 1 is a plan view for describing a memory device according to a first embodiment of the present invention.

Embodiments of the present invention will now be described with reference to the accompanying drawings. In the description below, common parts are denoted by like reference numerals throughout the drawings.

First Embodiment

An Example of Prevention of Garbling of Data in the Word Line Direction

Figure 2:
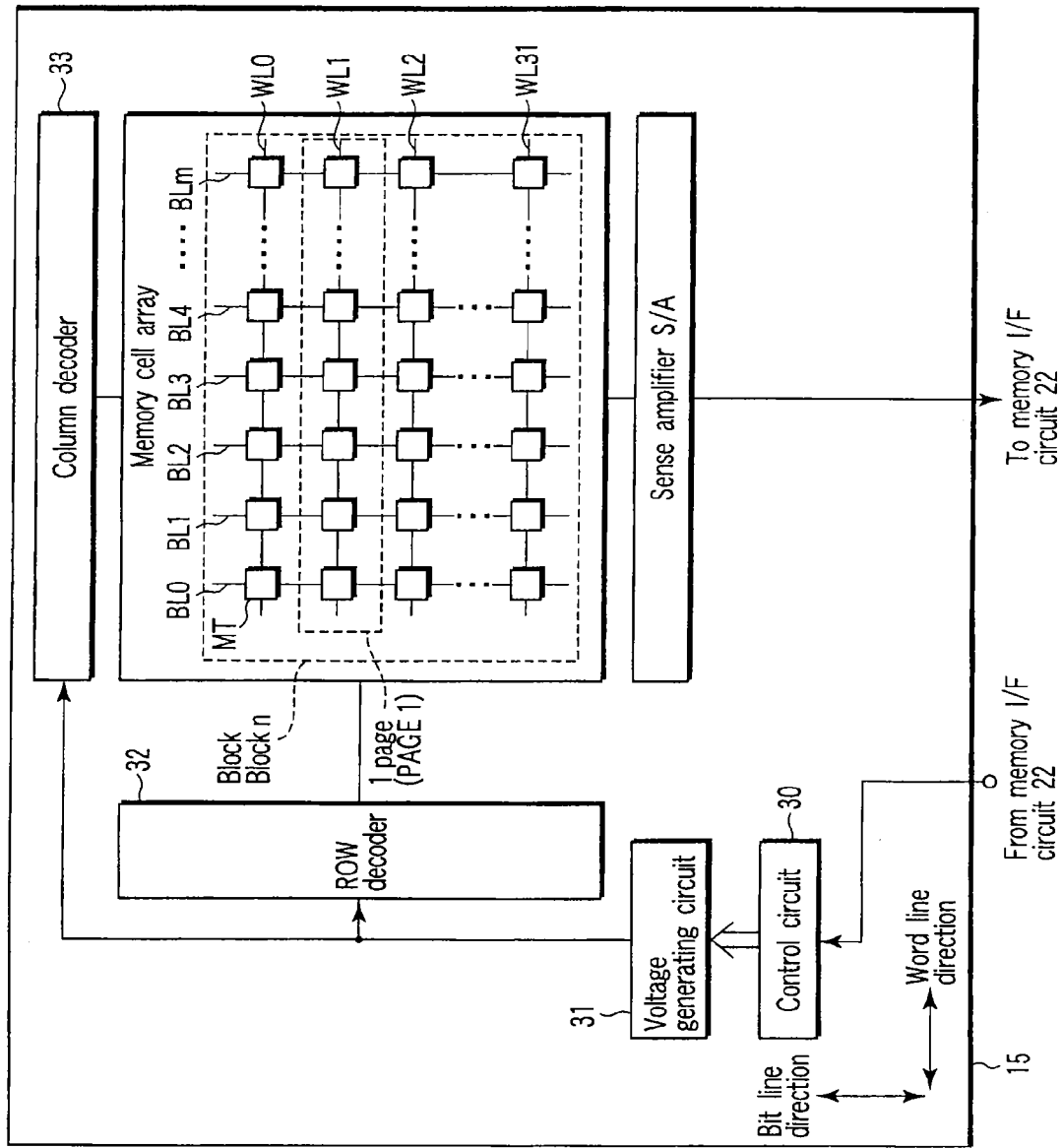
FIG. 2 is a block diagram of a NAND flash memory in FIG. 1.
Figure 3:
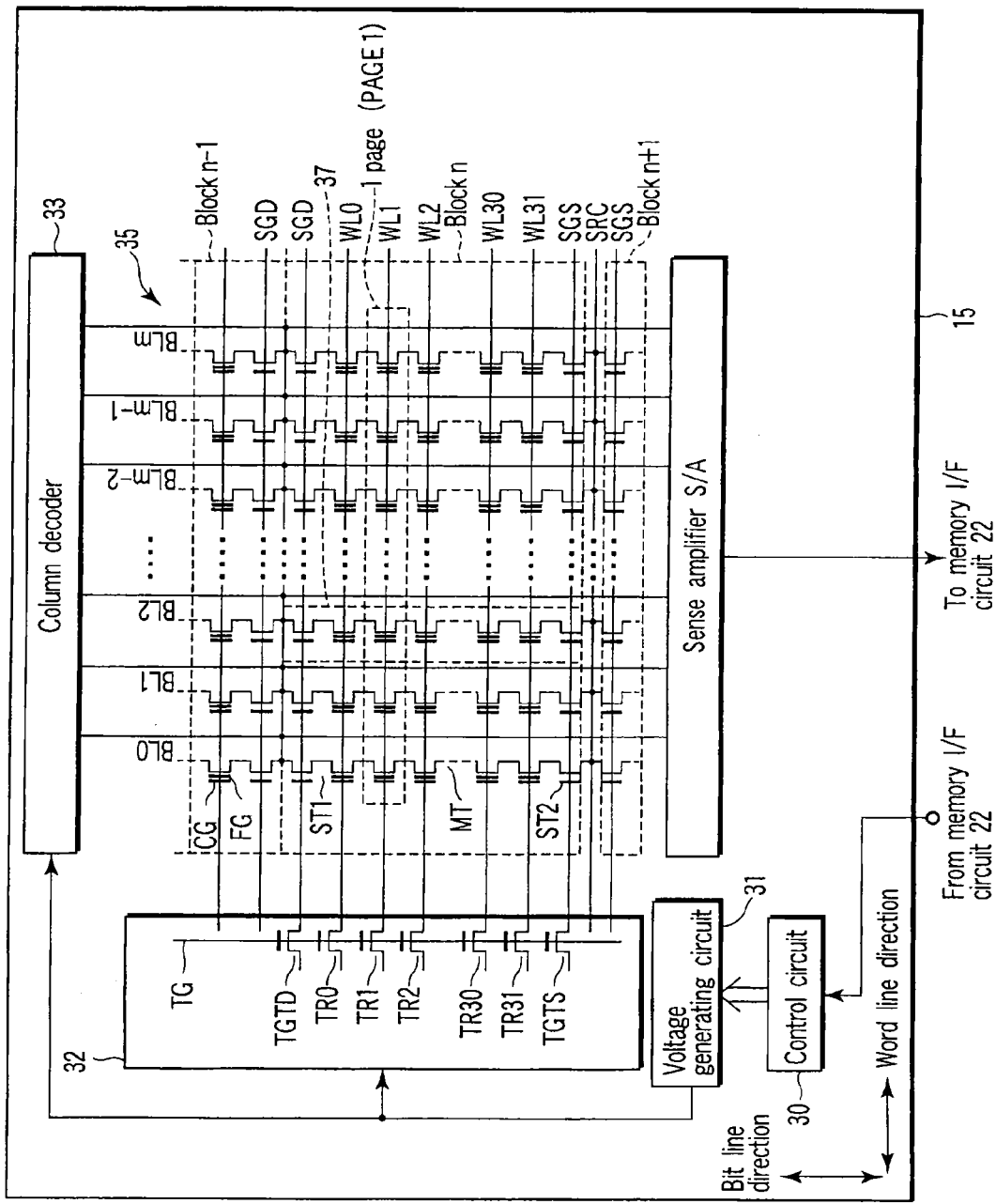
FIG. 3 is a circuit diagram of the NAND flash memory in FIG. 1.

Referring to FIG. 1 to FIG. 3, a memory device according to a first embodiment of the invention is described. FIG. 1 is a plan view for describing a memory device according to this embodiment. FIG. 2 and FIG. 3 are plan views for describing a NAND flash memory in FIG. 1.

As shown in FIG. 1, a memory device 11 executes transmission/reception of data, etc. to/from a host device 12 via a host interface (hereinafter referred to as "host I/F") 20. The host device 12 is, for instance, a personal computer or a mobile phone.

The memory device 11 includes a controller 16 and a NAND flash memory 15.

The controller 16 includes the host I/F 20, an MPU 21, a memory I/F circuit 22 and a buffer 23.

Transmission/reception of data, etc. is executed via the host I/F (external I/F) 20. The host I/F 20 is, for instance, a NAND interface.

The MPU 21 executes an overall control of the memory device 11.

The buffer 23 is configured to temporarily store data, an address, a command, etc., which are transmitted/received to/from the host device 12 or NAND flash memory 15.

The memory I/F circuit 22 subjects the transmission/reception data to correction, which is to be described later, under the control of the MPU 21, thus executing transmission/reception of data, etc., to/from the NAND flash memory 15.

The memory I/F circuit 22 includes a NAND I/F 25, an ECC circuit 26, a data pattern check circuit 27 and a data correction circuit 28.

Transmission/reception of data, an address, a command, etc., is executed between the controller 16 and NAND flash memory 15 via the NAND I/F (memory I/F) 25.

The ECC circuit 26 is configured to add an error correcting code (ECC) to data which is transmitted/received to/from the buffer 23.

The data pattern check circuit 27 is configured to execute a data pattern check by checking a data pattern, which is transmitted/received to/by the ECC circuit 26, and sending an address of a predetermined data pattern (to be described later) to the data correction circuit 28.

The data correction circuit 28 is configured to invert, at a time of a write operation (to be described later), the value of data of a predetermined data pattern, which is transmitted from the data pattern check circuit 27, and to send the inverted value (write level-inverted value) to the NAND I/F 25.

Next, referring to FIG. 2 and FIG. 3, the NAND flash memory 15 according to this embodiment is described in greater detail. As shown in FIG. 2 and FIG. 3, the NAND flash memory 11 includes a control circuit 30, a voltage generating circuit 31, a row decoder 32, a sense amplifier S/A, a column decoder 33 and a memory cell array 35.

The control circuit 30 is configured to control, in accordance with output signals from the memory I/F circuit 22, the voltage value of the voltage generating circuit 31 and addresses which are selected by the row decoder 32 and column decoder 33.

The voltage generating circuit 31 is configured to generate, under the control of the control circuit 30, voltages of predetermined values, for example, a write voltage, an erase voltage and a read voltage.

The row decoder 32 is configured to select word lines WL0 to WL31 and select gate lines SGD and SGS in accordance with addresses which are designated from the memory controller 16. As shown in FIG. 3, the row decoder 32 includes transfer gate transistors TGTD and TGTS and transfer transistors (high-voltage transistors) TR0 to TR31, which have gates commonly connected to a transfer gate line TG.

The transfer transistors TR0 to TR31 apply predetermined voltages, such as an erase voltage and a write voltage, to control electrodes CG of memory cell transistors MT.

The sense amplifier S/A is configured to amplify data of each page which is read out of bit lines BL0 to BLm, and to send the amplified data to the memory I/F circuit 22.

The memory cell array 35 is composed of a plurality of blocks (Block n−1, Block n, Block n+1, . . . ).

In the present embodiment, the NAND flash memory 15 is a single-level NAND flash memory which is capable of recording 1-bit data in one memory cell transistor MT.

As shown in FIG. 2 and FIG. 3, the block (Block n) includes a plurality of memory cell transistors MT which are arranged in a matrix at intersections between word lines WL0 to WL31 and bit lines BL0 to BLm.

Each of the memory cell transistors MT0 to MTm has a stacked structure comprising a tunnel insulation film provided on a semiconductor substrate; a floating electrode FG provided on the tunnel insulation film; an inter-gate insulation film provided on the floating electrode FG; and a control electrode CG provided on the inter-gate insulation film. Memory cell transistors MT, which neighbor in the direction of the bit line BL, have their sources/drains shared as their current paths. The current paths are connected in series at one end and the other end. In this example, 32 memory cell transistors are connected in series.

A NAND cell string 37 is composed of the memory cell transistors MT, which have their current paths connected in series at one end and the other end, and select transistors ST1 and ST2. The NAND cell string 37 is selected by the select transistors ST1 and ST2. One end of the current path of the NAND cell string 37 is connected to the sense amplifier S/A, and the other end of the current path is connected to a source line SRC.

The number of memory cell transistors MT is not limited to 32, and may be 8 or 16, for instance. In addition, only one of the select transistors ST1 and ST2 may be provided if the select transistor is configured to be able to select the NAND cell string 37.

The control electrodes CG of the memory cell transistors MT0 to MTm in the direction of the word line WL (row direction) are commonly connected to an associated one of the word lines WL0 to WL31. The gates of the select transistors ST1 are commonly connected to a select gate SGD, and the gates of the select transistors ST2 are commonly connected to a select gate SGS. The drain of the select transistor ST1 is connected to one of the bit lines BL0 to BLm+1, and the source of the select transistor ST2 is connected to a source line SRC.

A single address or a plurality of addresses are assigned to each of the word lines WL0 to WL31. For the purpose of convenience, a description is given of the case in which a single page address is assigned to a single word line. As indicated by a broken line in FIG. 3, one page (PAGE) is present in association with each of the word lines WL0 to WL31. For example, a page (PAGE 1) is present in association with the word line WL1. This page is a unit of data write and data read. An erase operation is executed batchwise in units of the block (Block).

<Write Operation>

Figure 4:
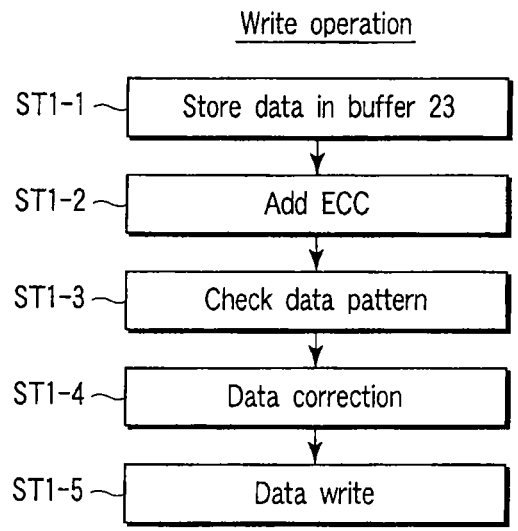
FIG. 4 is a flow chart illustrating a write operation of the memory device according to the first embodiment.

Next, the write operation of the memory device according to this embodiment is described with reference to a flow chart of FIG. 4. In this description, the case of writing data in a page (PAGE 1) of a block (Block n) is described by way of example.

(Step ST1-1 (Data Storage in the Buffer))

To start with, the MPU 21 develops write page data, an address, a command, etc., which are sent from the host device 12 via the host I/F 20, in the buffer 23, thus temporarily storing them.

(Step ST1-2 (Addition of ECC))

Subsequently, the ECC circuit 26 adds an error correcting code (ECC) to the data developed in the buffer 23. At this time, as shown in FIG. 5, for example, the error correcting code is added to an ECC area 47 that is a part of a redundant area 46 in the write page data.

In this example, the error correcting code is added prior to data correction (steps ST1-3 and ST1-4 (to be described later)). However, the error correcting code may be added after the data correction (steps ST1-3 and ST1-4).

(Step ST1-3 (Check of a Data Pattern))

Figure 5:
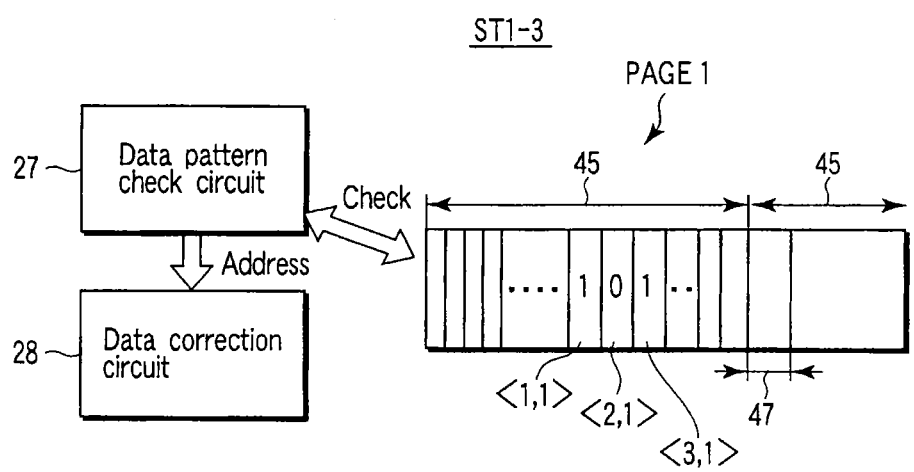
FIG. 5 illustrates a write step (ST1-3) of the memory device according to the first embodiment.

Subsequently, as shown in FIG. 5, the data pattern check circuit 27 determines whether a predetermined data pattern, in which garbling of data may occur, is present in one page data (PAGE 1) that is developed in the buffer 23.

For example, the data pattern check circuit 27 determines that a data pattern in a data area 45 of one page data, in which the values of data at an address position <1, 1> (<a, b>: a is in the word line WL direction, and b is in the bit line BL direction), an address position <2, 1> and an address position <3, 1> are "1", "0" and "1", respectively, is a data pattern in which garbling of data may possibly occur. Then, the data pattern check circuit 27 sends the address position <2, 1>, at which the data value is "0", to the data correction circuit 28.

(Step ST1-4 (Data Correction))

Subsequently, the data correction circuit 28 inverts the value of data at the address position, which is sent from the data pattern check circuit 27, and transfers the inverted data value (write level-inverted value) to the NAND flash memory 15.

Figure 6:
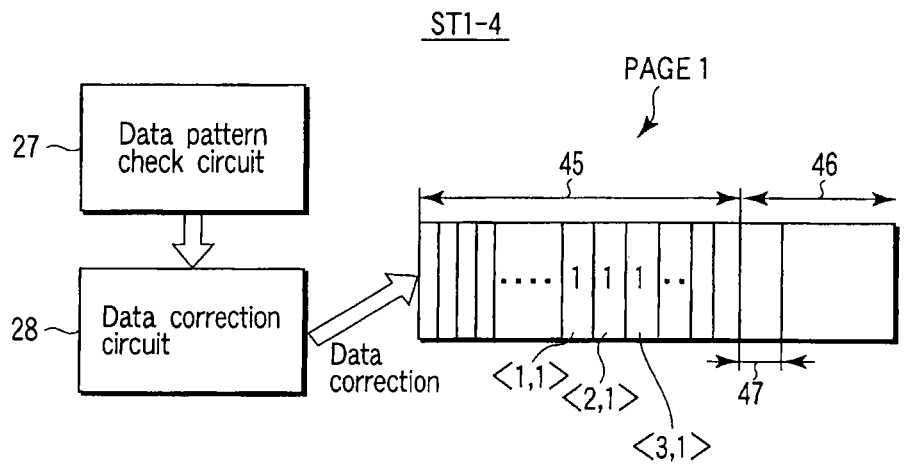
FIG. 6 illustrates a write step (ST1-4) of the memory device according to the first embodiment.

For example, as shown in FIG. 6, the data correction circuit 28 inverts the data value "0" at the address position <2, 1>, which is sent from the data pattern check circuit 27, and transfers the inverted data value "1" to the NAND flash memory 15.

(Step ST1-5 (Data Write))

Subsequently, the MPU 21 sends write data of the page data (PAGE 1) to the NAND flash memory 15 via the NAND I/F 25 in accordance with the corrected data. A command sequence at this time is shown in FIG. 7, for example.

Figure 7:
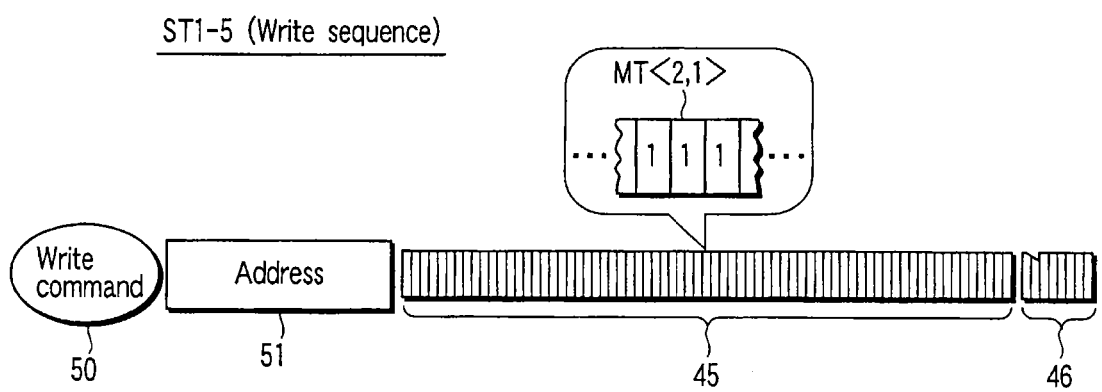
FIG. 7 shows a write sequence in a write step of the memory device according to the first embodiment.

As shown in FIG. 7, the MPU 21 successively sends to the NAND flash memory 15 a write command 50, a write address 51, and write data comprising a data area 45 and a redundant area 46. At this time, as described above, the data at the address position <2, 1> of the data area 45, for example, is inverted to data "1".

Thereafter, the data correction circuit 28 controls the control circuit 30 so as to write the data of page data (PAGE 1) in accordance with the corrected data. As a result, according to the data correction circuit 28, the control circuit 30 executes a control to inject carriers by a write voltage, which is generated from the voltage generating circuit 31, and to select addresses of the row decoder 32 and column decoder 33, thus carrying out write of page data.

Figure 8:
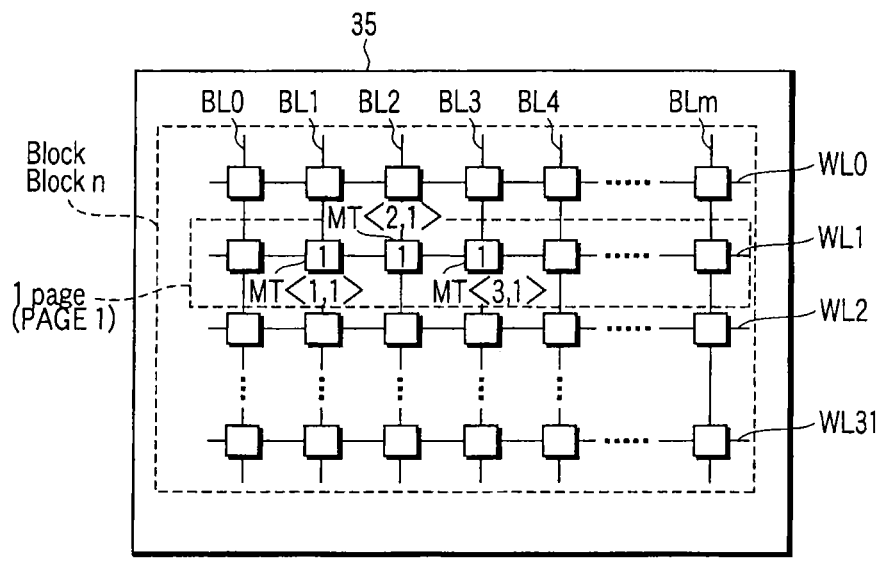
FIG. 8 shows a memory cell array after the write operation according to the first embodiment.

For example, as shown in FIG. 8, no carrier is injected in the memory cell transistor MT<2, 1> in the memory cell array 35, in order to write inverted "1" data. As a result, "1" data, "1" data and "1" data are written in the memory cell transistors MT<1, 1>, MT <2, 1>, and MT<3, 1>.

Subsequently, the above-described steps ST1-1 to ST1-5 are repeated for all pages in the NAND flash memory 15, thereby carrying out the write operation.

<Read Operation>

Figure 9:
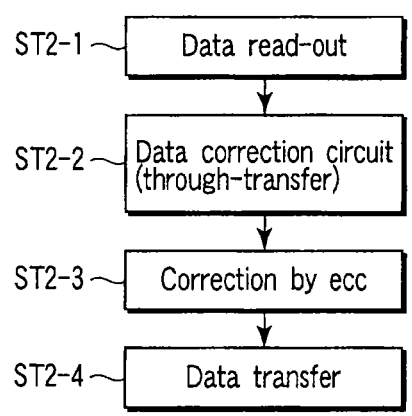
FIG. 9 is a flow chart illustrating a read operation of the memory device according to the first embodiment.
Figure 10:
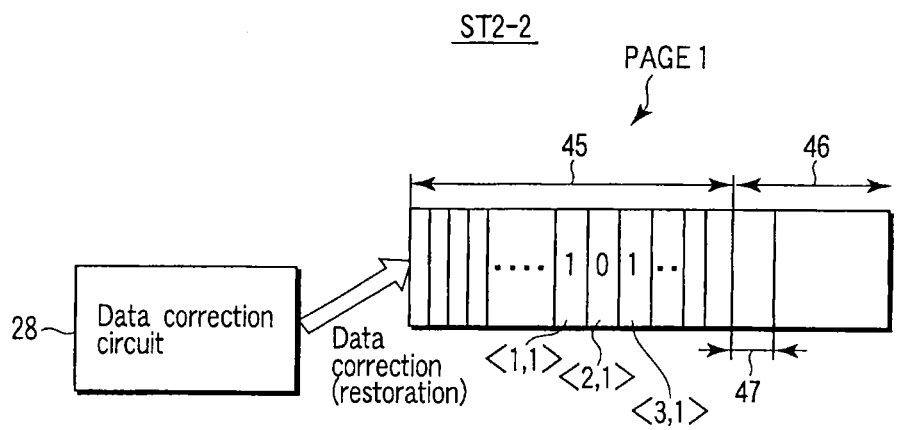
FIG. 10 illustrates a read step (ST2-2) of the memory device according to the first embodiment.

Next, the read operation of the memory device according to the present embodiment is described with reference to a flow chart of FIG. 9. In this description, the case of reading out data of the page (PAGE 1) of the block (Block n) is described by way of example.

(Step ST2-1 (Data Read))

To start with, the control circuit 30 in the NAND flash memory 15 controls the write voltage generated from the voltage generating circuit 31 and the addresses of the row decoder 32 and column decoder 33, and reads out the page data (PAGE 1). Then, the control circuit 30 amplifies the read data by the sense amplifier S/A, and sends the amplified data to the controller 16.

(Step ST2-2 (Through-Transfer))

Subsequently, the data correction circuit 28 sends to the ECC circuit 26 the read data that has been sent via the NAND I/F 25.

(Step ST2-3 (Correction by ECC))

Subsequently, the ECC circuit 26 executes error correction of the read page data by using an error correcting code (ECC). Specifically, the ECC circuit 26 detects an error bit in the page data and corrects the error bit, on the basis of an error correcting code, which is read out from the memory 15, and an error correction code which is newly generated from the data in the data area.

(Step ST2-4 (Data Transfer))

Subsequently, the MPU 21 sends the read data to the host device 12 via the host I/F 20.

Thereafter, the above-described steps ST2-1 to ST2-4 are repeated for all pages in the NAND flash memory 15, thereby carrying out the read operation.

According to the memory device of the present embodiment, as described above, the following advantageous effects (1) to (3) can be obtained.

(1) The occurrence of garbling of data can be prevented and the reliability can be enhanced.

Figure 11:
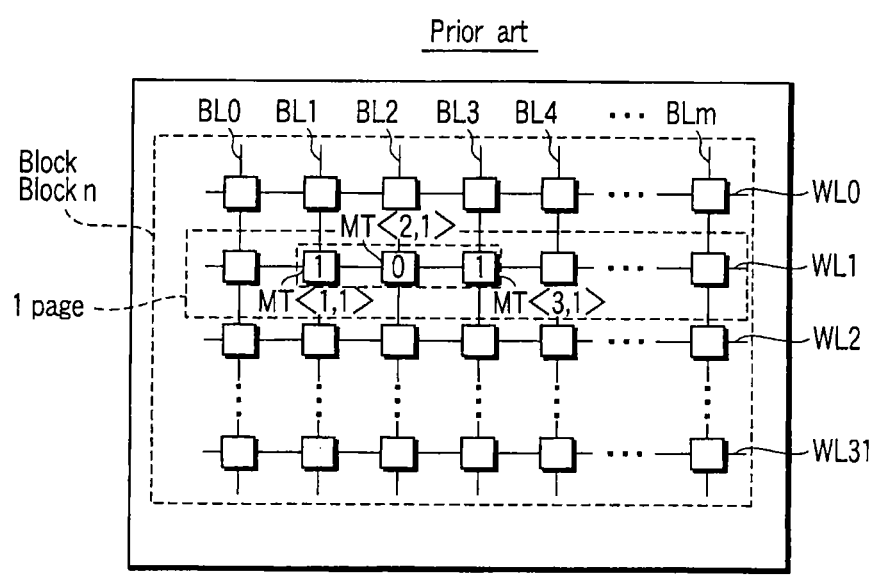
FIG. 11 shows a memory cell array after a write operation in prior art.

In the prior art, the above-described data pattern check and data correction are not executed. As a result, as shown in FIG. 11, for example, when data "0" is to be written in the memory cell MT<2, 1>, carriers are injected in the floating gate FG. In this case, however, as shown in FIG. 12, garbling of data occurs due to capacitive coupling resulting from microfabrication, and data "1" written in the memory cells MT<1, 1> and MT<3, 1> is erroneously read out as data "0". Consequently, recovery of data becomes impossible, and the reliability deteriorates.

On the other hand, the memory device 11 according to the present embodiment includes the data pattern check circuit 27 and data correction circuit 28. Thus, the data pattern check circuit 27 can determine, at the time of the write operation, whether there is a predetermined data pattern in which garbling of data may possibly occur. Assume now the case in which the data values at the address position <1, 1>, address position <2, 1> and address position <3, 1> in the data area 45 of one page data are "1", "0" and "1", respectively. In this case, the data correction circuit 28 corrects the data pattern in which garbling of data may possibly occur so as to invert the data value at the address position, which is sent from the data pattern check circuit 27, and transfers the inverted data value to the NAND flash memory 15. For example, the data correction circuit 28 inverts the data value "0" at the address position <2, 1>, which is sent from the data pattern check circuit 27, and transfers the inverted data "1" to the NAND flash memory 15 (step ST1-4).

As described above, the predetermined data pattern in which garbling of data may possibly occur can be avoided prior to the write operation. Therefore, the occurrence of garbling of data can be prevented and the reliability can be enhanced.

(2) Microfabrication and an increase in integration density can advantageously be achieved.

The degree of capacitive coupling increases with the progress in microfabrication and integration density and with the reduction in distance between neighboring memory cells MT. However, according to the present embodiment, as described in the above (1), the occurrence of garbling of data due to capacitive coupling can be prevented.

Therefore, the microfabrication and the increase in integration density of the NAND flash memory 15 can advantageously be achieved.

(3) The number of correction positions can be reduced and the decoding performance of data can be improved.

In the prior art, as shown in FIG. 11 and FIG. 12, for example, garbling of data occurs in the memory cells MT<1, 1> and MT<3, 1> due to capacitive coupling. In the case where error correcting codes ECC are to be added in order to prevent garbling of data, it is necessary to add error correcting codes ECC to, for example, two positions of the memory cells MT <1, 1> and MT<3, 1>, and to restore the data at the time of read-out.

On the other hand, the data correction circuit 28 according to the present embodiment can correct inverted data. For example, the data correction circuit 28 inverts "1" data at the address position <2, 1> and restores the data to the original "0" data. In this manner, in this embodiment, at the time of the read operation, it should suffice if data is restored at only one address position <2, 1>, for instance. Therefore, the number of correction positions can be reduced, and the decoding performance of data can be improved.

In the above-described first embodiment, the description has been given of the case in which one page address is assigned to one word line WL, that is, the case in which the same page address is assigned to the memory cell transistors MT which neighbor in the word line WL direction. However, the same advantageous effects (1) to (3) as described above can be obtained even in the case where different page addresses are assigned to the memory cell transistors MT which neighbor in the word line WL direction. In this case, the data pattern check circuit 27 refers to data patterns of different page addresses that are assigned to the memory cell transistors MT which neighbor in the word line WL direction, and determines whether data is to be inverted or not.

In the present embodiment, the single-level NAND flash memory has been described as an example of the NAND flash memory 15. However, the NAND flash memory 15 is not limited to this example and may be, for instance, a multilevel NAND flash memory which can record multi-bit data in one memory cell transistor.

[Modification (An Example of Prevention of Garbling of Data in the Bit Line Direction)]

Next, a memory device according to a modification of the invention is described with reference to FIG. 13. This modification relates to an example in which garbling of data in the bit line BL direction is prevented. In the description below, a detailed description of the parts common to those in the first embodiment is omitted.

The above-described garbling of data due to capacitive coupling may occur in the bit line BL direction, as well as in the word line WL direction as described in the first embodiment. To cope with this, a modification to be described below may be adopted.

In the above-described step ST1-3 in the write operation, the data pattern check circuit 27 determines whether a predetermined data pattern in the bit line BL direction, in which garbling of data may occur, is present in a plurality of page data that are developed in the buffer 23.

For example, the data pattern check circuit 27 determines that a data pattern, in which the data values at an address position <2, 0>, an address position <2, 1> and an address position <2, 2> of page data are "1", "0" and "1", respectively, is a data pattern in which garbling of data may possibly occur. Then, the data pattern check circuit 27 sends the address position <2, 1> to the data correction circuit 28.

Subsequently, the data correction circuit 28 inverts the data at the address position, which is sent from the data pattern check circuit 27, and transfers the inverted data to the NAND flash memory 15.

For example, as shown in FIG. 13, the data correction circuit 28 inverts the data "0" at the address position <2, 1>, which is sent from the data pattern check circuit 27, and transfers the inverted data "1" to the NAND flash memory 15 so that the data "0" may be written as data "1".

Subsequently, according to the data correction circuit 28, the control circuit 30 executes a control to inject carriers by a write voltage, which is generated from the voltage generating circuit 31, and to select addresses of the row decoder 32 and column decoder 33, thus carrying out write of page data.

For example, as shown in FIG. 13, no carrier is injected in the memory cell transistor MT<2, 1> in the memory cell array 35, in order to write inverted "1" data. As a result, "1" data, "1" data and "1" data are written in the memory cell transistors MT<2, 0>, MT <2, 1>, and MT<3, 1> which are arranged along the bit line BL2.

Subsequently, substantially the same steps as described above are repeated for all pages in the NAND flash memory 15, thereby carrying out the write operation.

As regards the read operation, the data restoration is carried out in the following manner. To start with, in the step ST2-2, read data is sent to the ECC circuit 26. In the subsequent step ST2-3, the ECC circuit 26 executes error correction of the received data on the basis of the error correcting code (ECC).

Subsequently, substantially the same steps as described above are repeated for all pages in the NAND flash memory 15, thereby carrying out the read operation.

According to the above-described memory device of this embodiment, the same advantageous effects (1) to (3) as described above can be obtained.

Figure 14:
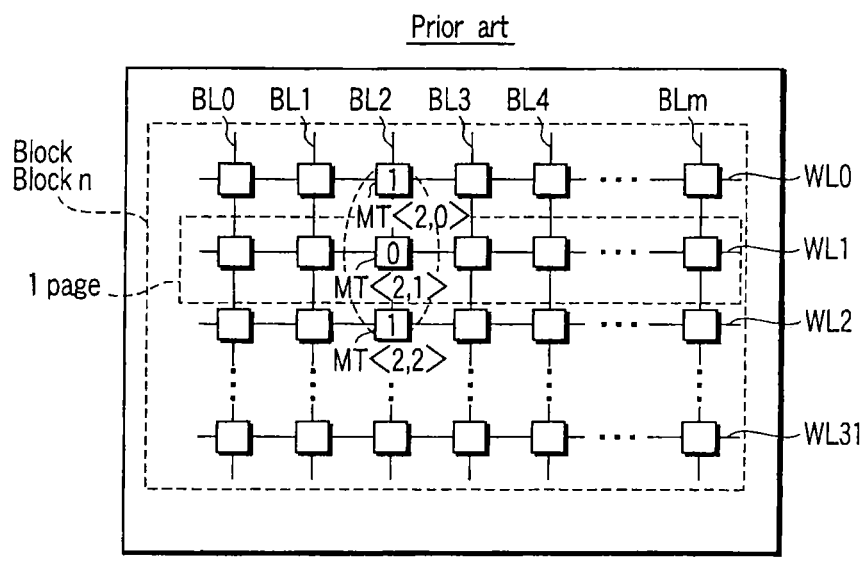
FIG. 14 shows a memory cell array after a write operation in the prior art.
Figure 15:
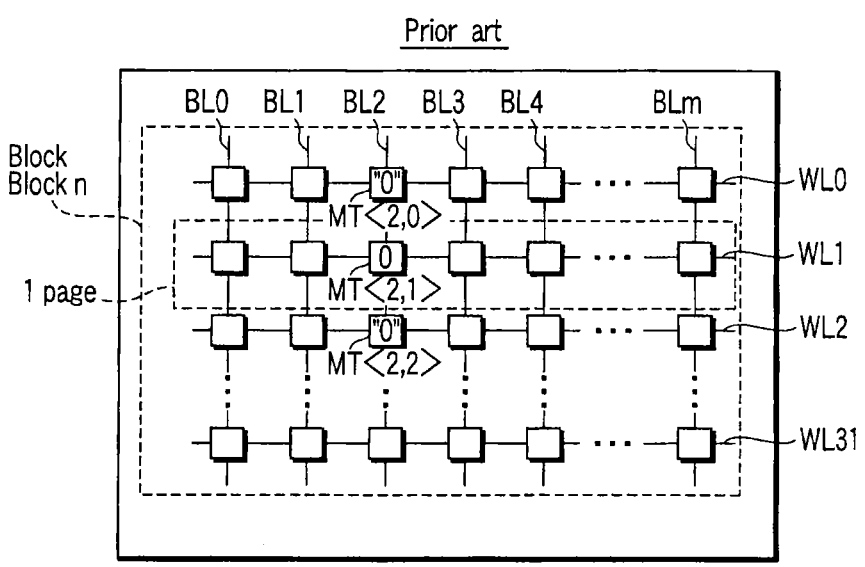
FIG. 15 is a view for describing a memory device in which garbling of data occurs in a word line direction in the prior art.

In the prior art, the above-described data pattern check and data correction are not executed. Thus, as shown in FIG. 14, for example, the potential in the memory cells MT<2, 0> and MT<2, 2> varies due to capacitive coupling at the time of injecting carriers in the floating gate FG in order to write data "0" in the memory cell MT<2, 1>. As a result, as shown in FIG. 15, garbling of data occurs, and the data "1" written in the memory cells MT<2, 0> and MT<2, 2> is erroneously read out as data "0". Consequently, recovery of data becomes impossible, and the reliability deteriorates.

On the other hand, in the present embodiment, in the step ST1-3 at the time of the write operation, the data pattern check circuit 27 checks whether there is a predetermined data pattern in the bit line BL direction, in which garbling of data may possibly occur, in the plural page data that are developed in the buffer 23. Subsequently, the data correction circuit 28 can invert the data at the address position which is sent from the data pattern check circuit 27, and can write the inverted data in the NAND flash memory 15.

As described above, according to this embodiment, the predetermined data pattern in the bit line BL direction, in which garbling of data may possibly occur, can be avoided prior to the write operation. Therefore, the occurrence of garbling of data in the bit line BL direction can be prevented and the reliability can be enhanced.

Second Embodiment

An Example in which Address Information is Added

Next, a memory device according to a second embodiment of the invention is described with reference to FIG. 16. This embodiment relates to an example in which an address generating circuit that adds address information is further included. In the description below, a detailed description of the parts common to those in the first embodiment is omitted.

As shown in FIG. 16, the second embodiment differs from the first embodiment in that a memory device 11 according to the second embodiment further includes an address generating circuit 55.

The address generating circuit 55 is configured to add an address of corrected data at the time of the write operation and read operation.

<Write Operation>

Figure 17:
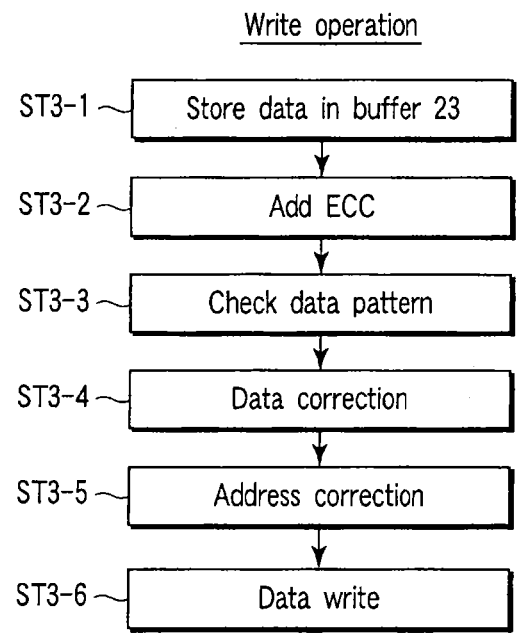
FIG. 17 is a flow chart illustrating a write operation of the memory device according to the second embodiment.

The write operation in this embodiment is described with reference to a flow chart of FIG. 17. A description is given of the case in which data in the word line WL direction is checked. To start with, the same steps ST3-1 to ST3-4 as in the first embodiment are executed.

(Step ST3-5 (Address Correction))

Figure 18:
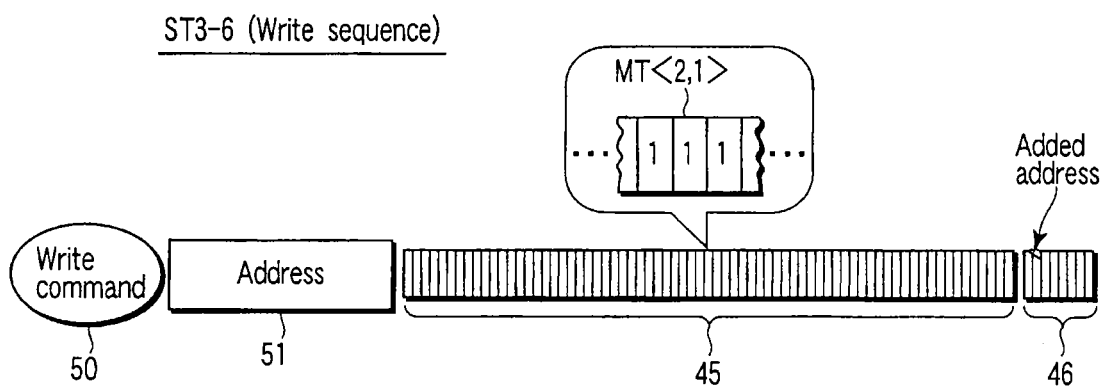
FIG. 18 shows a write sequence in a write step of the memory device according to the second embodiment.

Subsequently, the address generating circuit 55 adds an address of corrected data, which is included in the write data that is sent from the data correction circuit 28. FIG. 18 shows a command sequence in this step ST3-5.

As shown in FIG. 18, the MPU 21 successively sends to the NAND flash memory 15 a write command 50, a write address 51, and write data comprising a data area 45 and a redundant area 46. At this time, for example, the data at the address area position <2, 1> of the data area 45 is inverted to data "1". In addition, the address position <2, 1> of the corrected data is further written in the redundant area 46.

Subsequently, the same step ST3-6 as in the first embodiment is executed, and the write operation in this embodiment is carried out.

<Read Operation>

Figure 19:
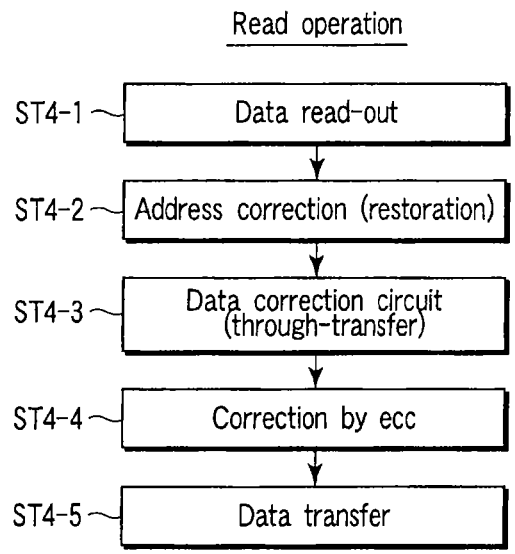
FIG. 19 is a flow chart illustrating a read operation of the memory device according to the second embodiment.

The read operation in the present embodiment is described with reference to a flow chart of FIG. 19. To start with, the same step ST4-1 as in the first embodiment is executed.

(Step ST4-2 (Address Correction), Step ST4-3 (Through-Transfer))

Subsequently, the data correction circuit 28 corrects (restores) data on the basis of the address of corrected data, which is sent from the address generating circuit 55, and transfers the obtained data.

Subsequently, the same steps ST4-3 to ST4-5 as in the first embodiment are executed, and the read operation of this embodiment is carried out.

According to the above-described memory device of this embodiment, the same advantageous effects (1) to (3) as described above can be obtained.

Furthermore, the memory device 11 of this embodiment further includes the address generating circuit 55. Thus, at the time of the write operation, the address generating circuit 55 can add an address of the memory cell transistor in which garbling of data may possibly occur (step ST3-5). Besides, at the time of the read operation, the data correction circuit 28 can correct (restore) the data on the basis of the address of the corrected data, which is sent from the address generating circuit 55 (step ST4-2, ST4-3).

By sending address information of the address, at which garbling of data may occur, to the ECC circuit 26, the position of data at which garbling of data may occur can be specified at the time of the read operation, and the decoding performance of the ECC can advantageously be enhanced. The reason is that if the address information, at which garbling of data may occur, is not sent to the ECC circuit 26, it is not possible to determine which address of data the error correcting code is to be added.

An example of the ECC, which has a correction performance that is enhanced if an address indicative of an error position is given, is an erasure correction/decoding method of a Reed-Solomon code.

Third Embodiment

An Example in which a Write Level is Shifted to a Level at which Occurrence of Garbling of Data can be Prevented Next, a memory device according to a third embodiment of the invention is described with reference to FIG. 20. This embodiment relates to an example in which data correction is executed so as to shift the write level to a level at which occurrence of garbling of data can be prevented. In the description below, a detailed description of the parts common to those in the first embodiment is omitted.

As shown in FIG. 20, the third embodiment differs from the first embodiment in that at the time of the write operation, the data correction circuit 28 of the third embodiment is configured to send to the control circuit 30 such a control signal S1 as to shift the write level to a level at which occurrence of garbling of data can be prevented.

<Write Operation>

The read operation in the third embodiment differs from the read operation in the first embodiment with respect to the following point. At the time of the step ST1-4, the data correction circuit 28 does not completely invert the data at the address position which is sent from the data pattern check circuit 27, and sends to the NAND flash memory 15 the control signal S1 which corrects data so as to shift the write level to a level at which occurrence of garbling of data can be prevented.

Figure 21:
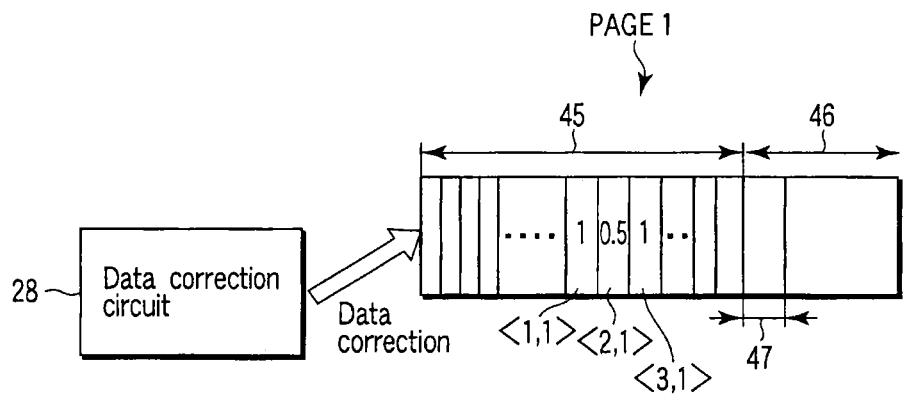
FIG. 21 illustrates a write step in the third embodiment.

In the case of the present embodiment, for example, as shown in FIG. 21, the data correction circuit 28 sends the control signal S1 so as to correct data in a manner to shift "erasure" data of the address position <2, 1>, which is sent from the data pattern check circuit 27, to a "semi-write" level (half-value level) of the write voltage, at which occurrence of garbling of data can be prevented.

Subsequently, at the time of the step ST1-5, the control circuit 30, which has received the control signal S1, shifts the write voltage level, which is generated from the voltage generating circuit 31, in accordance with the control signal S1, and the control circuit 30 executes a control to select addresses of the row decoder 32 and column decoder 33, thereby carrying out page data write.

Thus, in the case of the present embodiment, for example, as shown in FIG. 22, the shifted "semi-write" data is written in the memory cell transistor MT<2, 1> in the memory cell array 35. As a result, "write" data, "semi-write" data and "write" data are written in the memory cell transistors MT<1, 1>, MT<2, 1> and MT <3, 1>, respectively.

Subsequently, the same steps as in the first embodiment are executed, and the read operation of this embodiment is carried out.

<Read Operation>

The read operation of this embodiment differs from the read operation of the first embodiment with respect to the following point. In the above-described step ST2-2, the data correction circuit 28 restores the data, which is included in the read data sent from the NAND flash memory 15 and is corrected so as to shift the voltage value, to the original value.

In the case of the present embodiment, for example, the data correction circuit 28 restores the "semi-write" data of the address position <2, 1>, which is sent from the NAND flash memory 15, to the "erasure" level of the original value.

On the other hand, "1 write" data and "1 write" data can stably be read out of the memory cell transistors MT<1, 1> and MT<3, 1>, respectively.

Subsequently, the same steps as in the first embodiment are executed, and the read operation in this embodiment is carried out.

According to the above-described memory device of this embodiment, the same advantageous effects (1) to (3) as described above can be obtained.

Furthermore, according to the present embodiment, the data correction circuit 28 does not completely invert the data at the address position which is sent from the data pattern check circuit 27, and sends to the NAND flash memory 15 the control signal S1 which corrects data so as to shift the write level to a level (half-value level) at which occurrence of garbling of data can be prevented. Subsequently, the control circuit 30, which has received the control signal S1, can shift the write voltage level, which is generated from the voltage generating circuit 31, in accordance with the control signal S1, and can carry out page data write.

As described above, this embodiment is effective in the case where garbling of data can be prevented more comprehensively if the write level is shifted without complete inversion of data.

In the above embodiment and modification, the description has been given of the case of inverting data from "erasure" to "write" or shifting data from "erasure" to "semi-write", as an example of data correction. However, the data correction is not limited to this example. In the case where garbling of data may possibly occur in neighboring memory cell transistors MT due to data write, the same advantageous effects as described above can be obtained as far as data is corrected so as to prevent occurrence of garbling of data (e.g. write data is corrected from "write" to "erasure").

For example, in the above-described step ST1-3 (data pattern check), consider the case in which data at the address position <1, 1>, position <2, 1> and position <3, 1> are "erasure", "write" and "erasure", respectively. In this case, assume that if carriers are subsequently injected in the floating gate of the memory cell transistor MT<2, 1>, garbling of data occurs and the data in the neighboring memory cell transistors MT<1, 1> and MT<3, 1> are erroneously read out from "write" to "erasure". In this case, in the subsequent step ST1-4, the data correction circuit 28 may execute the write operation in the memory cell transistor MT<2, 1> so as to invert the data from "1" to "0".

In the above description, the block (Block n), which is an SLC area, has been described by way of example. However, the invention is similarly applicable to other blocks (Block n−1, Block n+1) which are multilevel NAND flash memories configured as MLC areas that are capable of recording multi-bit data, and the same advantageous effects can be obtained.

Moreover, in the above description, the description has been given of, by way of example, the case of checking the data pattern in one of the bit line BL direction and the word line WL direction, and executing data correction. However, it may be possible to execute data correction in both the bit line BL direction and the word line WL direction, by considering the data patterns.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of controlling a memory device comprising a nonvolatile semiconductor memory comprising a first group of memory cells and a first word line, the first group of memory cells being commonly connected to the first word line, and a first page address being assigned to the first word line, the method comprising:
   receiving first data from outside of the memory device;
   changing the first data by inverting at least one bit of the first data;
   inputting a first command to the nonvolatile semiconductor memory;
   inputting the first page address to the nonvolatile semiconductor memory after inputting the first command; and
   inputting the changed first data to the nonvolatile semiconductor memory after inputting the first page address;
   wherein the nonvolatile semiconductor memory stores the changed first data in the first group of memory cells in accordance with the first command and the first page address.

2. The method according to claim 1, wherein the nonvolatile semiconductor memory further comprises a second group of memory cells and a second word line, the second group of memory cells being commonly connected to the second word line, the first word line being adjacent to the second word line, and a second page address being assigned to the second word line; the method further comprising:
   receiving second data from outside of the memory device;
   changing the second data by inverting at least one bit of the second data;
   inputting a second command to the nonvolatile semiconductor memory;
   inputting the second page address to the nonvolatile semiconductor memory after inputting the second command; and
   inputting the changed second data to the nonvolatile semiconductor memory after inputting the second page address; and
   the nonvolatile semiconductor memory stores the changed second data in the second group of memory cells in accordance with the second command and the second page address after the nonvolatile semiconductor memory stores the changed first data in the first group of memory cells.

3. The method according to claim 1, further comprising:
adding an error correcting code to the first data before changing the first data; and
inputting the error correcting code to the nonvolatile semiconductor memory along with the changed first data.

4. The method according to claim 1, wherein said changing the first data is performed to prevent a data pattern which can cause an error in the first data.

5. The method according to claim 1, wherein the nonvolatile semiconductor memory is a NAND flash memory.

6. A memory device comprising:
a nonvolatile semiconductor memory comprising a first group of memory cells and a first word line, the first group of memory cells being commonly connected to the first word line, and a first page address being assigned to the first word line; and
a controller configured to perform:
receiving first data from outside of the memory device;
changing the first data by inverting at least one bit of the first data;
inputting a first command to the nonvolatile semiconductor memory;
inputting the first page address to the nonvolatile semiconductor memory after inputting the first command; and
inputting the changed first data to the nonvolatile semiconductor memory after inputting the first page address;
wherein the nonvolatile semiconductor memory stores the changed first data in the first group of memory cells in accordance with the first command and the first page address,
wherein said changing the first data is performed to prevent data pattern which can cause the error in the first data.

7. The memory device according to claim 6, wherein the nonvolatile semiconductor memory further comprises a second group of memory cells and a second word line, the second group of memory cells being commonly connected to the second word line, the first word line being adjacent to the second word line, and a second page address being assigned to the second word line;
the controller is further configured to perform:
receiving second data from outside of the memory device;
changing the second data by inverting at least one bit of the second data and not inverting remaining bits of the second data;
inputting a second command to the nonvolatile semiconductor memory;
inputting the second page address to the nonvolatile semiconductor memory after inputting the second command; and
inputting the changed second data to the nonvolatile semiconductor memory after inputting the second page address; and
the nonvolatile semiconductor memory stores the changed second data in the second group of memory cells in accordance with the second command and the second page address after the nonvolatile semiconductor memory stores the changed first data in the first group of memory cells.

8. The memory device according to claim 6, wherein the controller is further configured to add an error correcting code to the first data before changing the first data, and to input the error correcting code to the nonvolatile semiconductor memory along with the changed first data, and
the nonvolatile semiconductor memory stores the error correcting code in the first group of memory cells.

9. The memory device according to claim 6, wherein the nonvolatile semiconductor memory is a NAND flash memory.

10. The memory device according to claim 6, wherein the first and second groups of memory cells are included in one block which is a unit of data erasing.

* * * * *